3,440,395
ARC WELDING METHOD AND APPARATUS
Martin Rebuffoni and Edward R. Gamberg, Williamsville,
N.Y., assignors to Westinghouse Electric Corporation,
Pittsburgh, Pa., a corporation of Pennsylvania
Filed Mar. 9, 1965, Ser. No. 438,268
Int. Cl. B23k 9/06, 9/10
U.S. Cl. 219—131                        1 Claim

ABSTRACT OF THE DISCLOSURE

An apparatus and a method for welding with low current densities in which a substantially constant potential source of direct current energy is supplied through an inductive reactance of variable magnitude; the welding magnitude of the reactance being sufficient so that during a welding operation the increase in current caused by short circuiting of the electrode to the work will not cause spattering and of sufficient magnitude to refire the welding arc and means for reducing the magnitude of the reactance prior to the initiation of the welding arc to a sufficiently lower value to permit a substantially increased current to flow at the initiation of the arc after which the magnitude of the reactance is increased to the welding magnitude.

---

This invention relates to arc welding and has particular relationship to arc welding with a power supply of the substantially constant-potential type or in which a small inductive reactance is included to achieve desired slope for welding materials of certain types. A typical such supply is disclosed in Adamson Patent 3,129,352 and in Steinert Patent 3,078,362.

This invention is particularly applicable to arc welding with a consumable electrode. To the extent that this invention may be applicable to arc melting, such application of the invention is to be regarded within its scope and to this extent the reference to arc welding in the claims is intended to include arc melting.

The supplies disclosed in these patents, with which this invention concerns itself, are frequently operated at low voltage and low current to weld thin gauge material. Typically the voltage may be of the order of 20 volts and the current of the order of 120 to 150 amperes, 19 v.—120 to 150 amperes more common at present. In welding at small currents and voltage the current density is usually so low that the material is transferred through the arc in drops of appreciable diameter or in globules rather than as a spray. The transfer is such that the drops or globules repeatedly short-circuit the gap between the electrode and the work thus in effect short-circuiting the supply. At the inception or a short-circuit the rate of rise of the current across the globule which short-circuits the gap is maintained relatively low by the inductive reactance in the power supply so that spattering of the material is avoided. With the short circuit present the voltage across the gap drops substantially to zero so that the arc is extinguished. The current through the inductive reactance is then decreased to a low magnitude producing substantial back electromotive force which is added to the potential of the supply and refires the arc. Oscillographs show that the arc refires while current is still flowing through the reactor, albeit at a low magnitude. In welding as just described then the arc is repeatedly extinguished by short circuiting and refired.

The low-voltage, low-current operations just described is of advantage not only in the welding of thin materials but in vertical or overhead welding. In this case the transfer of a metal of the material from the elcetrode to the work through globules is effective to build-up the weld. The viscosity of the material is so high in this operation that there is no tendency for the melted material from the electrode to run vertically or to drop from an overhead bead.

In addition this invention concerns itself with welding in which the power supply is of the constant-potential type including reactance but the welding current is so high that the operation is in the spray transfer range. As is disclosed in the Adamson patent the inductive reactance in the constant-potential supply has advantages in the spray transfer range.

The apparatus described above is used predominantly in arc welding work with a consumable electrode. In the use of this apparatus the potential is impressed between the electrode and the work and the electrode is advanced towards the work until it is brought in contact with the work. On contact the flow of current between the electrode and the work at the tip of the electrode causes the electrode to melt rapidly and an arc to be fired.

In the use of apparatus including welding power supplies of the type just described difficulty has been encountered in starting the arc. At times the arc fails to start entirely, at other times the arc starts but does not become established and continues to sputter.

The arc is also at times started after a substantial delay. Such delay starting of the arc introduces difficulties particularly where the operation requires repeated refiring of the arc and in automatic and semi-automatic welding.

In accordance with the teachings of the prior art, attempts were made to improve the firing of the arc during the start of a welding operation by increasing the power supply voltage during this operation. This practice has not proved satisfactory.

It is an object of this invention to overcome the above described difficulties.

It is another object of this invention to provide arc-welding apparatus in which the power for the arc is supplied from a generally constant-potential supply including inductive reactance in the use of which the arc shall be started and established instantaneously.

It is a further object of this invention to provide a method of operating welding apparatus including a power supply of the constant potential type having inductive reactance, effectively and with a smooth arc, particularly in situations in which the arc is repeatedly refired.

It is another object of this invention to provide a method of arc welding with a consumable electrode and a power supply of the generally constant-potential type having inductive reactance in the practice of which the arc shall be started and established instantaneously.

In accordance with this invention the power supply is so set as to deliver a very high current during starting while the electrode is short-circuited to the work. Specifically the inductive reactance in the power supply is reduced to a very low magnitude for a short time interval during starting so that when the top of the electrode is in contact with the work with this inductive reactance so reduced the short circuit current which flows is very large. Where the inductive reactance is lumped it may be short circuited during the starting interval in the practice of this invention.

It has been found in the practice of this invention that the arc is instantaneously and reliably started and established. Once the arc is established the reactance is introduced into the power supply circuit and the arc is maintained without difficulties.

The novel features considered characteristic of this invention are disclosed generally above. For a clearer understanding of this invention, both as to its organization and as to its method of operation, together with additional objects and advantages thereof, reference is made to the accompanying drawings in which.

Figure 1:
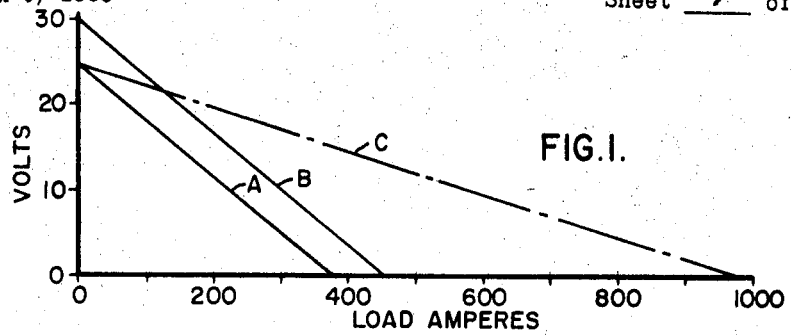
FIG. 1 is a graph comparing the prior-art practice with practice in accordance with this invention.

The important features of this invention are illustrated in FIG. 1 in which the voltage at the terminals of the arc welding power supply is plotted vertically in volts and load current is plotted horizontally in amperes. The full-line Curve A represents the volt-ampere characteristic during normal welding. In this representation the slope of the Curve A is shown substantially greater than in actual practice. Assuming the conditions as represented by Curve A, the open-circuit voltage impressed across the arc is about 24½ volts and the short-circuit current is about 380 amperes. The full line Curve B represents the condition achieved in attempting to improve firing of the arc during the starting of welding in accordance with the teachings of the prior art. In this case, the open circuit voltage during starting is raised to 30 volts; the resulting short-circuit current is about 460 amperes. This expedient has not proved satisfactory.

In arriving at this invention it has been realized that the short-circuit current of 460 amperes is too small for effective starting. In accordance with this invention, the power-supply voltage remains at the operating magnitude of 24½ volts but the reactance is reduced to a very low magnitude by short circuiting. The resulting voltage-current characteristic is illustrated by the dash-dot Curve C. In this case the short-circuit current rises to a magnitude of 980 amperes. This current is so high that it produces instantaneous melting of the tip of the electrode and certain and reliable starting.

Figure 2:
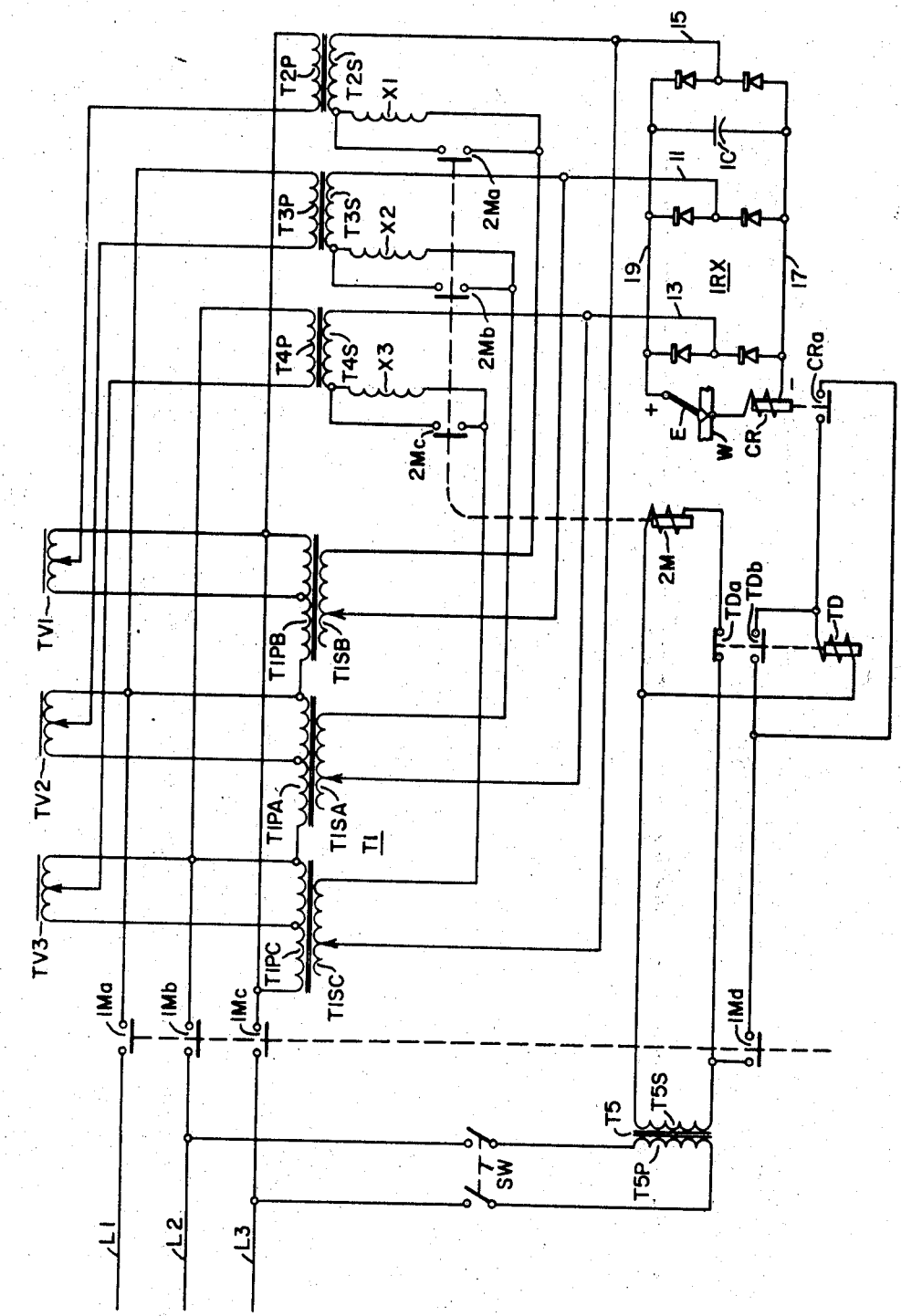
FIG. 2 is a schematic showing a preferred embodiment of this invention.

In FIG. 2 apparatus is shown for practicing this invention. This apparatus includes a three-phase transformer T1 the primary T1PA, T1PB and T1PC of which is connected in delta and is adapted to be connected between the buses L1, L2, L3 of a commercial three-phase power supply through the contacts 1Ma, 1Mb, 1Mc, of a contactor 1M.

Each primary winding of the transformer T1 supplies a variable auto-transformer TV1, TV2, TV3. Each variable transformer TV1, TV2, TV3 supplies the primary T2P, T3P, T4P respectively of a booster transformer.

The transformer T1 includes a plurality of secondary windings T1SA, T1SB and T1SC connected in delta and in series with the secondary windings T2S, T3S, T4S of the booster transformer and with the inductive reactor windings X1, X2, X3. Each inductive reactor winding X1, X2, X3 is adapted to be shorted out by the associated contacts 2Ma, 2Mb and 2Mc respectively of a contactor 2M.

A rectifier bridge 1RX preferably composed of silicon diodes is connected in rectifying relationship with the secondary delta T1S, T3S, T4S, X1, X2, X3. The input terminals or conductors 11, 13, 15 of the bridge 1RX are connected to the apices of the delta. The bridge has output terminals or conductors 17 and 19 of the supply across which a surge-suppressing capacitor 1C is connected. One of the connectors 17 is connected to the work W through the coil of a current relay CR; the other conductor 19 is connected directly to the welding electrode E. Typically the electrode E is a consumable electrode supplied continuously through a welding gun or torch (not shown), to the work.

The apparatus so far disclosed is a low-impedance generally, constant-potential welding supply. Typically such apparatus has a voltage-current characteristic for which the voltage drop is about 6 volts per hundred amperes of load current with the reactors X1, X2, X3 in the circuit and about 2 volts per hundred amperes with the reactors X1, X2, X3 shunted out of the circuit. Typically the reactors X1, X2 and X3 produces an overall voltage drop in the secondary delta or about 12 volts, when the DC load current is about 200 amperes.

For control purposes a control transformer T5 is provided. The primary T5P of this transformer T5 is adapted to be connected between the conductors L2 and L3 directly through a switch SW. The secondary T5S of the transformer T5 is connected to supply the winding of the contactor 2M and winding (not shown) of the contactor 1M through the usual overload and terminal contacts OL and TG respectively. The contactor 1M may be controlled from a control panel (not shown) at which the operator may start and stop and welding operation typically by operating or releasing the trigger of a gun (not shown). The control panel and the contactor 1M may be remotely disposed with reference to the remainder of the apparatus. The coil of the contactor 2M is adapted to be connected across the secondary T5S through the back contacts TDa of a time-delay relay TD. The coil of the relay TD is adapted to be connected across the secondary T5S through the front contact CRa of the current relay CR and the contact 1Md of contactor 1M.

At start of a welding operation the switch SW is closed so that potential appears across the secondary T5S. Contactor 2M is then actuated through contact TDa and contacts 2Ma, 2Mb and 2Mc are closed to shunt out the reactor windings X1, X2, X3 in the secondary delta.

The gun or torch through which the electrode is supplied is then placed in welding relationship with the work and a switch (not shown) on the gun or on the remote panel is closed to actuate contactor 1M. Contacts 1Ma, 1Mb and 1Mc are then closed to supply power to the main transformer T1. Potential then appears between the electrode E and the work W. The switch (not shown) also causes the electrode E to be advanced into welding relationship with the work W by a drive (not shown). When the electrode E contacts the work, current flows through the electrode E and the work. Since the inductive reactance X1, X2, X3 in the circuit is very low, a high short-circuit current flows (see Curve C of FIG. 1) and the tip of the electrode is instantaneously fused and an arc is instantaneously fired and established to start the welding. The flow of welding current actuates the relay CR closing contacts CRa. Since 1Md is at this time closed, current is supplied to relay TD and the timing-out of relay TD starts. Contact TDa opens and contact TDb closes only after TD times out. (The apparatus also operates satisfactorily with TDb an instantaneous contact which closes instantaneously when TD is energized.)

With the arc established, as is usually the case, relay TD continues to time out until it is actuated opening TDa and closing TDb. TDb locks in the relay TD through the contact 1Md. The opening of TDa deenergizes contactor 2M opening contacts 2Ma, 2Mb and 2Mc and inserting the inductive reactance X1, X2, X3 in the circuit. The welding now continues with the volt-ampere-characteristic slope set by the reactances as long as necessary or desirable.

At the end of the welding operation the switch on the gun or remote panel may be opened to deenergize contractor 1M interrupting the welding power supply and also opening the circuit through the coil of relay TD. Relay TD is then deenergized reclosing TDa and again actuating contactor 2M preparatory to another operation.

If the arc should fail to fire or be established after contact between the electrode E and the work W, CR would become deenergized, TD would remain unenergized and 2M would remain actuated. Another attempt to fire the arc would then be made.

If after the arc is fired and established and TD is actuated, the welding operation should be interrupted, contactor 1M would remain actuated and relay CR would be deenergized opening contactor CRa. The opening of contactor CRa would not affect timing relay TD and contactor 2M would remain unactuated. The restarting of an arc would in this case not be difficult if shortly after the arc is extinguished the electrode E is brought into contact with the work. If difficulty is encountered in starting the arc the switch on the gun or panel may be opened to deenergize the contactor 1M and reset the apparatus for a new starting operation.

Figure 3:
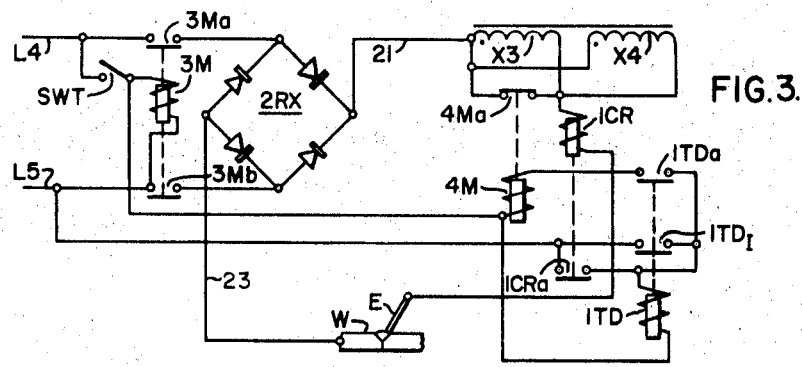
FIG. 3 is a schematic showing a modification of this invention.
Figure 4:
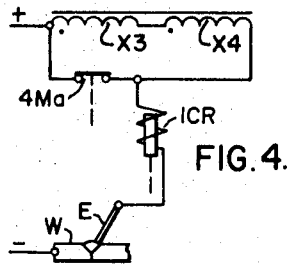
FIGS. 4 and 5 are fragmental schematics showing modifications of FIG. 3.
Figure 5:
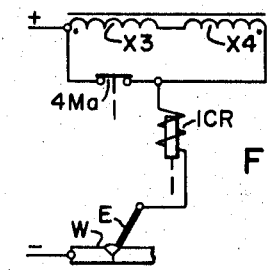

In FIGS. 3 through 5 the invention is shown as applied to a supply in which there is reactance X4 and X3 in the direct-current part of the apparatus. In this case the direct current conductors 21 and 23 are energized from single-phase alternating current conductors L4 and L5 through contacts 3Ma and 3Mb of a contactor 3M and through rectifier 2RX. Conductor 21 is connected to the electrode E through reactor windings X3 and X4 in parallel and through current relay 1CR. Reactor windings X3 and X4 are shunted by back contact 4Ma of contactor 4M.

The actuation of switch SWT on the gun or remote panel energizes 3M and also starts the advance of electrode E to work W. Prepurging of work by shielding gas may also be started by closing SWT. When the electrode E contacts the work W, the reactance X3, X4 is out of the circuit and an arc is fired and established instantaneously. 1CRa is at this time actuated closing contacts 1CRa.

Timing relay 1TD is then energized. This relay has an instantaneous contact $1TD_1$ which closes immediately and locks in 1TD (through SWT). Relay 1TD also has a contact 1TDa which closes after the relay times out. 1TD times out in a time interval after it is energized long enough to establish the arc. At this point contactor 4M is energized opening its contacts 4Ma so that the welding continues with X3 and X4 in the circuit. FIGS. 4 and 5 show different ways in which the reactors X3 and X4 and contact 4Ma may be connected. Like the apparatus shown in FIG. 2 the apparatus shown in FIGS. 3, 4, 5 is of the low-impedance type.

Figure 6:
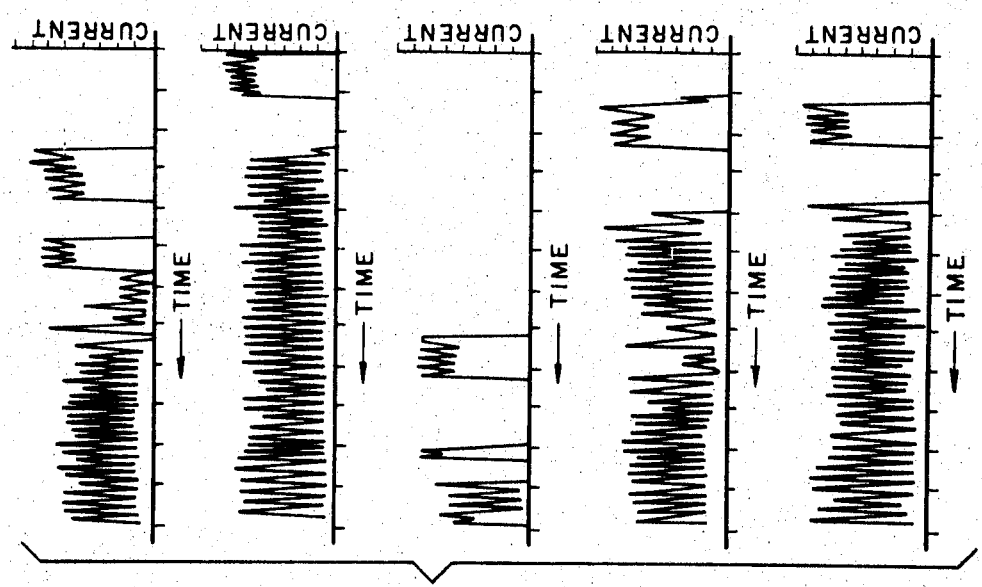
FIG. 6 is a copy of an oscillogram taken during the start of a welding operation in accordance with prior-art practice.
Figure 7:
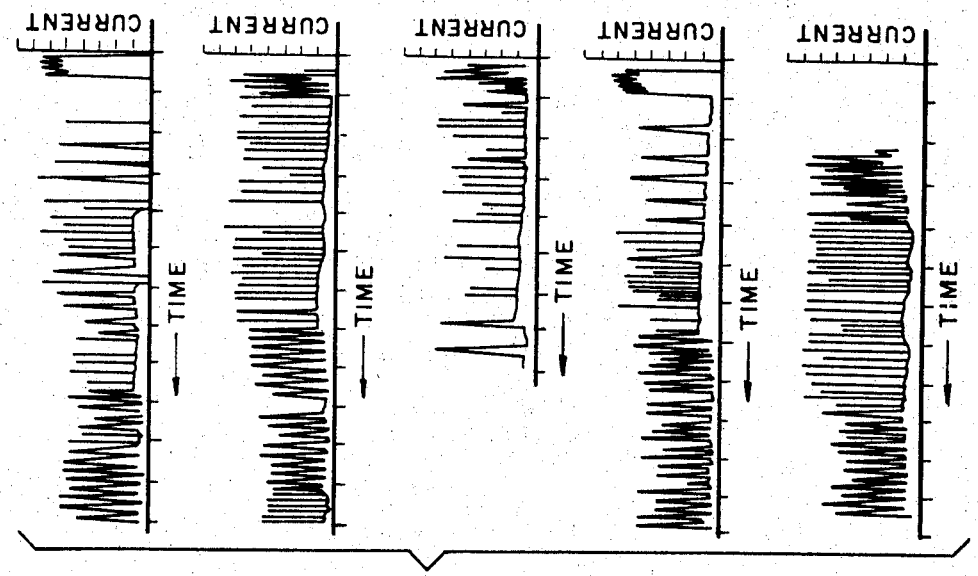
FIG. 7 is a similar copy of an oscillogram taken during the start of a welding operation in the practice of this invention.

FIG. 6 shows an oscillogram produced during the starting of an arc following prior-art practice with apparatus generally similar to FIG. 2 but lacking the features of this invention and FIG. 7 shows like oscillograms produced during the starting of an arc in the practice of the invention. In these oscillograms current is vertical and time is horizontal increasing from right to left. Each of the horizontal spaces represents 50 milliseconds and the vertical space above the horizontal axis represents 333 amperes. The unreliability of the starting following prior-art practice is manifested by the irregular traces on the right of FIG. 6. FIG. 7 includes no such irregularities.

Figure 8:
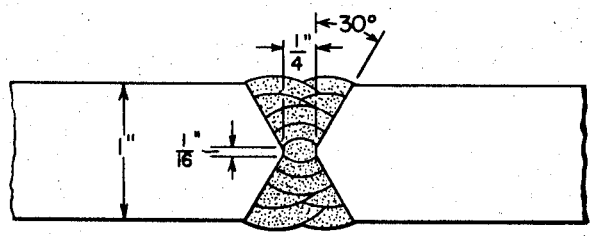
FIG. 8 is a view in cross-section showing diagrammatically the beads of a weld made vertically in the practice of the invention.

FIG. 8 shows the principal characteristics and dimensions of a welded structure produced by multipass welding in the practice of this invention. In this operation two plates of HY-80 high-strength steel extending vertically were butt welded. The power-supply used was of the type shown in FIG. 2. A consumable electrode, U.C.C., M188 of .030 inch diameter was used. This electrode was supplied through a gun and the arc was shielded by a shielding atmosphere of 75% argon and 25% carbon dioxide. The preheat temperature for the first pass was 200° F.; the interpass temperature 300° F. In producing the passes after the second the electrode was moved back and forth transversely to the seam with a dwell of about ⅙ second at the reversal. The producing of this structure demanded repeated refiring of the arc and the effectiveness of the refiring which was experienced demonstrated the utility of this invention.

While preferred embodiments of this invention have been disclosed herein, many modifications thereof are feasible. This invention then is not to be restricted except insofar as is necessitated by the spirit of the prior art.

We claim as our invention:

1. Apparatus for arc-welding work with an electrode including a main transformer having primary means and secondary means, a booster transformer having primary means and secondary means, reactance means, power supply conductors, means connecting said primary means of said main transformer and of said booster transformer in power-deriving relationship with said conductors, means connecting said secondary means of said main transformer, said secondary means of said booster transformer and said reactance means in series relationship in a secondary circuit, rectifier means, means connecting said rectifier means in rectifying relationship with said secondary circuit, switch means connected to said reactance means in said secondary circuit, means responsive to the energization of said conductors for actuating said switch means to shunt said reactance means out of said secondary circuit, and timing means responsive to the establishment of a welding arc between said electrode and work for actuating said switch means to interrupt the shunt and to connect said reactance means in said circuit so long as said welding arc is burning.

References Cited

UNITED STATES PATENTS

| | | | |
|---|---|---|---|
| 2,066,123 | 12/1936 | Requa | 219—135 |
| 2,365,611 | 12/1944 | White. | |
| 2,769,118 | 10/1956 | Lester. | |
| 2,873,356 | 2/1959 | Carroll et al. | 219—131 |
| 2,909,647 | 10/1959 | Glenn. | |
| 3,054,884 | 9/1962 | Manz et al. | 219—131 |
| 3,078,362 | 2/1963 | Steinert. | |
| 3,249,735 | 5/1966 | Needham | 219—131 |
| 3,253,119 | 5/1966 | Manz | 219—135 |
| 3,291,960 | 12/1966 | Folkhard et al. | 219—131 |

RICHARD M. WOOD, *Primary Examiner.*

B. A. STEIN, *Assistant Examiner.*